(12) United States Patent
Whangbo et al.

(10) Patent No.: US 9,164,285 B2
(45) Date of Patent: Oct. 20, 2015

(54) THREE-DIMENSIONAL IMAGE DISPLAY APPARATUS

(75) Inventors: Sang Woo Whangbo, Seoul (KR); Jinhwan Kim, Suwon-si (KR); Haeyoung Yun, Suwon-si (KR); Seung Jun Jeong, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 383 days.

(21) Appl. No.: 13/472,205

(22) Filed: May 15, 2012

(65) Prior Publication Data
US 2013/0128354 A1 May 23, 2013

(30) Foreign Application Priority Data

Nov. 21, 2011 (KR) ........................ 10-2011-0121708

(51) Int. Cl.
*G02B 27/22* (2006.01)

(52) U.S. Cl.
CPC .................................. *G02B 27/2214* (2013.01)

(58) Field of Classification Search
None
See application file for complete search history.

(56) References Cited

U.S. PATENT DOCUMENTS

| 6,064,424 A | 5/2000 | van Berkel et al. |
| 6,118,584 A * | 9/2000 | Van Berkel et al. .......... 359/463 |
| 6,801,243 B1 | 10/2004 | Van Berkel |
| 7,787,008 B2 * | 8/2010 | Fukushima et al. ............ 348/51 |
| 2005/0083246 A1 | 4/2005 | Saishu et al. |
| 2007/0188517 A1 * | 8/2007 | Takaki .......................... 345/613 |
| 2008/0079662 A1 | 4/2008 | Saishu et al. |
| 2010/0013912 A1 | 1/2010 | Lee et al. |
| 2010/0039698 A1 | 2/2010 | Robinson et al. |
| 2010/0259697 A1 * | 10/2010 | Sakamoto et al. .............. 349/15 |
| 2011/0248994 A1 * | 10/2011 | Van Der Horst et al. ..... 345/419 |

FOREIGN PATENT DOCUMENTS

| JP | 2006-106607 A | 4/2006 |
| JP | 2009519497 A | 5/2009 |
| KR | 1020100125021 A | 11/2010 |
| WO | 2006/040698 A1 | 4/2006 |

OTHER PUBLICATIONS

Yasuhiro Takaki, "Multi-view 3-D display employing a flat-panel display with slanted pixel arrangement," Journal of the SID 18/7, 2010, pp. 476-482.
Tatsuya Sugita et al., "P-192L: Late-News Poster: Moire Reduction of Luminance Enhanced LCDs with a Wobbled Micro-Lenticular Lens," SID 10 Digest, pp. 1616-1619.

* cited by examiner

*Primary Examiner* — Jade R Chwasz
(74) *Attorney, Agent, or Firm* — Innovation Counsel LLP

(57) ABSTRACT

A 3D image display apparatus includes a display panel including a plurality of pixels to display an image and a lenticular lens plate disposed in front of the display panel and including a plurality of lenticular lenses. The pixels are arranged to have an arrangement axis inclined with respect to a vertical axis of the display panel, and the lenticular lenses have a lens axis inclined with respect to the vertical axis of the display panel.

22 Claims, 14 Drawing Sheets

THREE-DIMENSIONAL IMAGE DISPLAY APPARATUS

CROSS-REFERENCE TO RELATED APPLICATION

This application relies for priority upon Korean Patent Application No. 10-2011-0121708 filed on Nov. 21, 2011, the contents of which are herein incorporated by reference in its entirety.

BACKGROUND

1. Field of Disclosure

The present invention relates to a three-dimensional (3D) image display apparatus. More particularly, the present invention relates to a 3D image display apparatus with improved display quality.

2. Description of the Related Art

In general, a 3D image display apparatus provides a left-eye image and a right-eye image separately to a left eye and a right eye of an observer. The left-eye image and right-eye image are offset to provide binocular disparity. The observer watches the left- and right-eye images provided from the 3D image display apparatus through each eye, and thereby perceives a 3D image.

In order to provide the left-eye and right-eye images separately to the left and right eyes of the observer, polarizing glasses are frequently used. The polarizing glasses utilize linear-polarization to separate the left-eye image and the right-eye image. Such polarizing glasses are, however, inconvenient for the observer to wear when viewing 3D images in, for instance, 3D movies.

Recently, various methods have been suggested that allow the observer to perceive the 3D image without having to wear polarizing glasses. Such methods include, for instance, a lenticular method, a parallax method, an integral photography method, a holography method, etc.

However, a cross-talk phenomenon and a moiré effect occur in the 3D image display apparatus employing the lenticular method.

SUMMARY

A 3D image display apparatus capable of improving the quality of the 3D display are provided.

A 3D image display apparatus includes a display panel that includes a plurality of pixels to display an image, and a lenticular lens plate disposed in front of the display panel and that includes a plurality of lenticular lenses. The pixels are arranged to have an arrangement axis inclined with respect to a vertical axis of the display panel, and the lenticular lenses have a lens axis inclined with respect to the vertical axis of the display panel.

Each of the pixels includes a first side substantially parallel to a horizontal axis of the display panel and a second side adjacent to the first side and substantially parallel to the arrangement axis thereof.

The boundary between the lenticular lenses may have a wave shape.

In another aspect, a 3D image display apparatus includes a display panel that includes a plurality of pixels to display an image, and a lenticular lens plate disposed in front of the display panel and that includes a plurality of lenticular lenses. Each of the pixels includes a first area having a rectangular shape with a width in a direction of a horizontal axis of the display panel, a second area disposed adjacent to a first side of the first area, wherein the first side is adjacent the first are in a vertical direction perpendicular to the horizontal axis, and a third area disposed adjacent a second side of the first area opposite the first side. When one pixel of the plurality of pixels is referred to as a reference pixel, the first area of a second pixel disposed directly below the reference pixel is shifted to either a left side and a right side of the first area of the reference pixel by the width of the first area, and the first area of a third pixel disposed directly above the reference pixel is shifted to a remaining one of the left side and the right side of the first area of the reference pixel by the width of the first area, and the lenticular lenses have a lens axis substantially parallel to the vertical axis of the display panel.

In another aspect, a 3D image display apparatus includes a display panel that includes a plurality of pixels to display an image and a lenticular lens plate disposed in front of the display panel and that includes a plurality of lenticular lenses. Each of the pixels includes a first area having a rectangular shape with a width in a direction of a horizontal axis of the display panel, a second area disposed adjacent to a first side the first area, wherein the first side is adjacent the first are in a vertical direction perpendicular to the horizontal axis, and a third area disposed adjacent to a second side of the first area opposite the first side, where one pixel among the pixels is referred to as a reference pixel, a second pixel disposed above of the reference pixel is referred to as an upper pixel, and a third pixel disposed below the reference pixel is referred to as a lower pixel, a sum of areas of the upper and lower pixels is equal to a size of the first area, which corresponds to the first area extended parallel to a first imaginary line substantially parallel to the vertical axis and passing through the first area.

According to the above, although an observer does not wear polarizing glasses, the observer may perceive the 3D image through the 3D image display apparatus, thereby improving a display quality of the 3D image display apparatus.

BRIEF DESCRIPTION OF THE DRAWINGS

The above and other advantages will become readily apparent by reference to the following detailed description when considered in conjunction with the accompanying drawings wherein.

DETAILED DESCRIPTION

Figure 1:
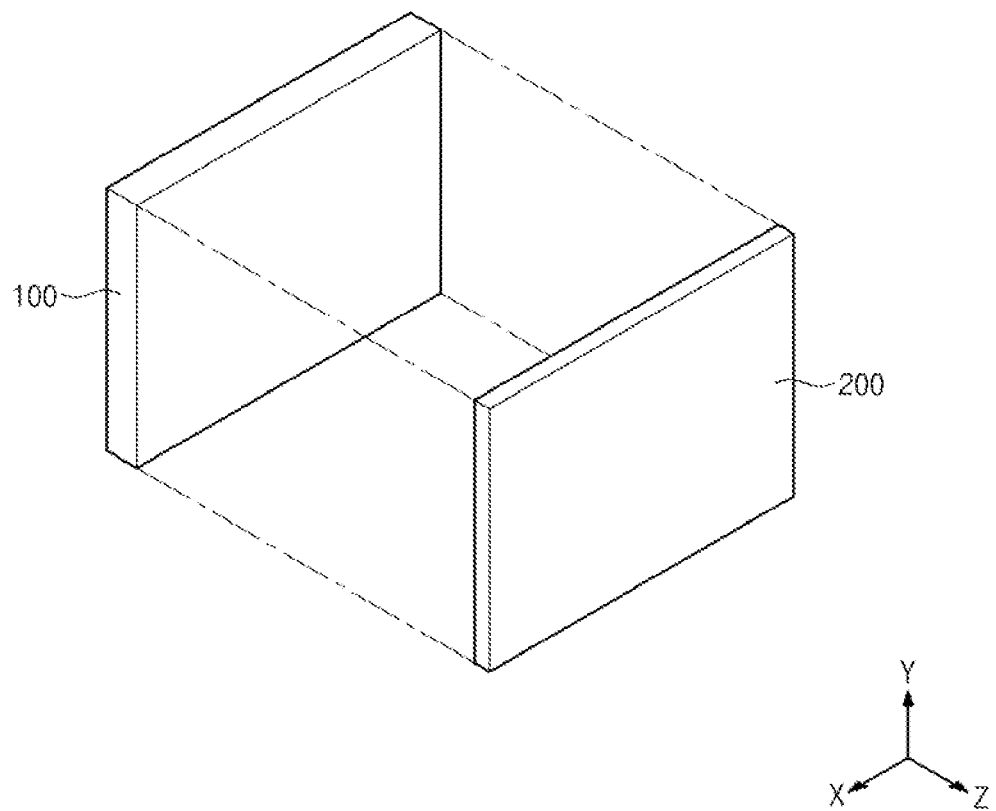
FIG. 1 is a schematic view showing a 3D image display apparatus according to an exemplary embodiment.

It will be understood that when an element or layer is referred to as being "on", "connected to" or "coupled to"

another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements or features described as "below" or "beneath" other elements or features would then be oriented "above" the other elements or features. Thus, the exemplary term "below" can encompass both an orientation of above and below, depending on the orientation of the device. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments will be explained in detail with reference to the accompanying drawings.

FIG. 1 is a schematic view showing a 3D image display apparatus according to an exemplary embodiment and FIGS. 2 to 8 are partially enlarged views showing display panels and lenticular lens plates used in the 3D image display apparatus shown in FIG. 1.

Figure 2:
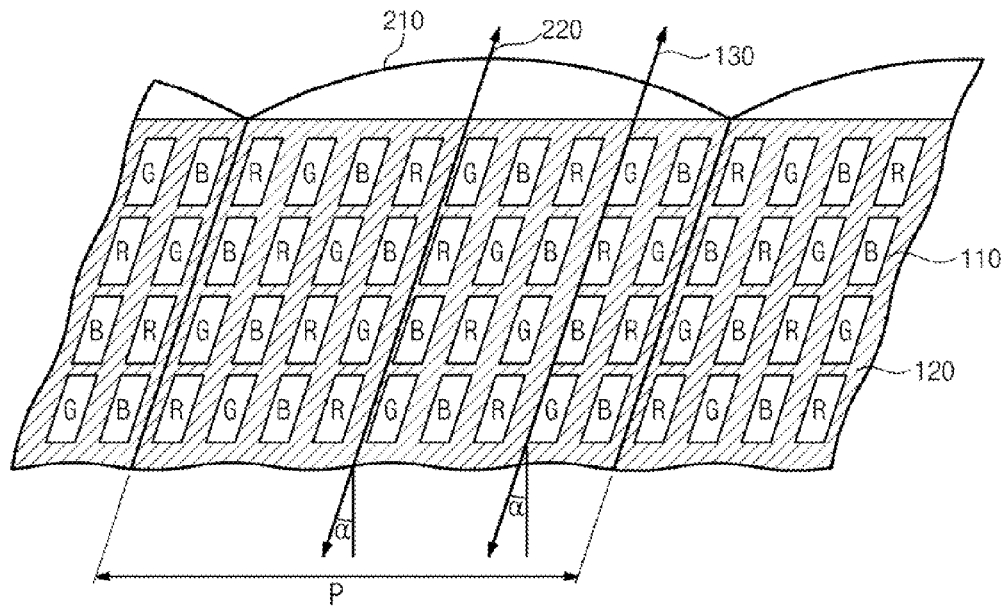
FIGS. 2 to 8 are partially enlarged views showing display panels and lenticular lens plates used in the 3D image display apparatus shown in FIG. 1.
Figure 3:
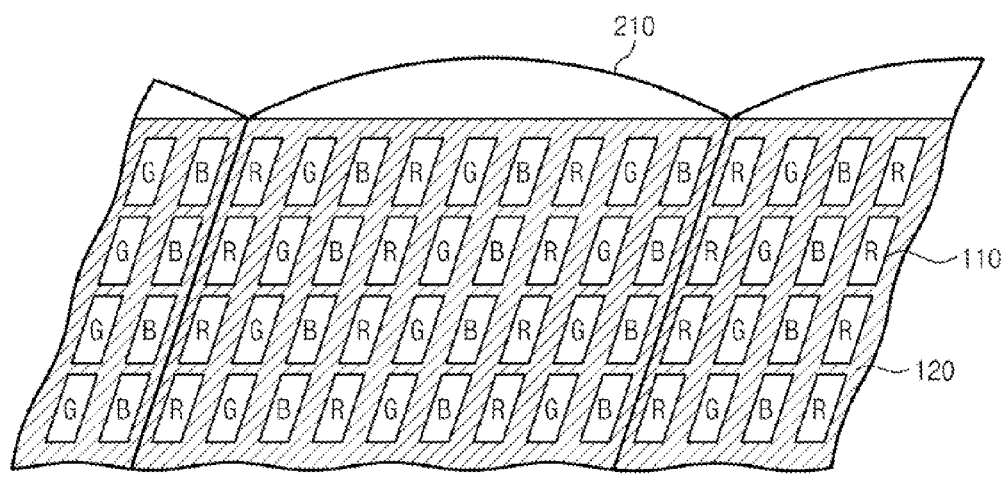

Referring to FIGS. 1 to 3, a 3D image display apparatus includes a display panel 100 and a lenticular lens plate 200. The display panel 100 includes a plurality of pixels 110 to display an image. The lenticular lens plate 200 includes a plurality of lenticular lenses and is disposed in front of the display panel 100 to separate the image displayed on the display panel 100 in left and right eye directions of an observer, that is, the lenticular lenses direct the light from the left eye image of the display to the left eye of the observer and the light from the right eye image of the display to the right eye of the observer.

The display panel 100 displays a left-eye image and a right-eye image. The display panel 100 may be any one of a variety of display panels, including, but not limited to, a liquid crystal display panel (LCD), an electrophoretic display panel (EPD), an organic light emitting display (OLED) panel, a plasma display panel (PDP), etc. In the present exemplary embodiment, the liquid crystal display panel will be described as a representative example of display panel 100.

The pixels 110 are arranged in a matrix form and a light blocking layer 120, such as a black matrix, is disposed between the pixels 110. Accordingly, the light blocking layer 120 may have a lattice shape.

Each of the pixels 110 represents one color. For instance, each of the pixels 110 represents one of red (R), green (G), or blue (B). In addition, as shown in FIG. 2, each pixel 110 has a first side that is substantially parallel to a horizontal axis of the display panel 100 and another side, which is adjacent to the first side, that is inclined at an inclination angle (a) with respect to a vertical axis of the display panel 100. The horizontal axis of the display panel 100 is the axis parallel to the top of the display panel, and is typically substantially parallel to the imaginary line running horizontally between the left and right eye of an observer, when the observer is sitting upright to view the display panel (for instance, the horizontal axis is parallel to the arrow 'x' in FIG. 1). The vertical axis of the display panel 100 is perpendicular to the horizontal axis of the display panel 100 (for instance, the axis is parallel to the array 'y' in FIG. 1).

Accordingly, the pixels 110 are arranged to be inclined with respect to the vertical axis of the display panel 100 by the inclination angle ($\alpha$). That is, an arrangement axis 130 of the pixels 110 is inclined by the inclination angle ($\alpha$) with respect to the vertical axis of the display panel 100.

As shown in FIG. 3, the colors of the pixels 110 are arranged so that, in the direction substantially parallel to the arrangement axis 130 thereof (i.e., along the column direction), the pixels 110 have the same color. In the direction substantially parallel to the horizontal axis of the display panel 100 (i.e. along the row direction), the colors of the pixels 110 are arranged so that the red (R), green (G), and blue (B) colors alternate sequentially.

Alternatively, as shown in FIG. 2, the colors of the pixels 110 can be arranged so that the red (R), blue (B), and green (G) colors alternate sequentially in the direction substantially parallel to the arrangement axis 130 (i.e. along the column direction). The colors of the pixels 110 in FIG. 2 are also arranged so that the red (R), green (G), and blue (B) colors alternate sequentially in the direction substantially parallel to the horizontal axis of the display panel 110 (i.e. along the row direction).

In addition, the display panel 100 has a rectangular plate shape with two long sides and two short sides and displays the image through a predetermined area thereof. The display panel 100, which, for in the present example, is an LCD panel, includes an array substrate (not shown), an opposite substrate (not shown) facing the array substrate, and a liquid crystal layer (not shown) disposed between the array substrate and the opposite substrate, as are understood by one of ordinary skill in the art.

The array substrate includes a plurality of pixel areas corresponding to the pixels 110, respectively. As understood by one of ordinary skill in the art, each pixel area includes a gate line (not shown) extended in a first direction, a data line (not shown) extended in a second direction crossing the first direction and insulated from the gate line, a pixel electrode (not shown), and a thin film transistor (not shown) electrically connected to the gate line, the data line, and the pixel electrode. The thin film transistor applies a driving signal to a corresponding pixel electrode. In addition, a driver IC (not shown) is disposed adjacent to a side of the array substrate. The driver IC receives various signals from an external device (not shown) and outputs the driving signal to the thin film transistor in response to the various signals.

As understood by one of ordinary skill in the art, the opposite substrate includes RGB color filters (not shown) disposed thereon to realize predetermined color using the light from a backlight unit (not shown) and a common electrode (not shown) disposed on the RGB colors to face the pixel electrode. The RGB color filters are formed through a thin film process. In the present exemplary embodiment, the color filters are disposed on the opposite substrate, but it should not be limited thereto or thereby. That is, the color filters may be disposed on the array substrate according to embodiments.

The liquid crystal layer includes liquid crystal molecules that align in a specific direction in response to an electric field generated between the pixel electrode and the common electrode as a result of voltages that are applied to the pixel electrode and the common electrode. Accordingly, the liquid crystal layer controls a transmittance of the light from the backlight unit, thereby displaying a desired image on the display panel 100.

Additionally, a polarizing film (not shown) may be disposed between the display panel 100 and the backlight unit to polarize the light provided from the backlight unit. The lenticular lens plate 200 includes a plurality of lenticular lenses 210 that are inclined at a predetermined angle with respective to the vertical axis of the display panel 100. The lenticular lenses 210 separate a plurality of disparity images according to polarizing directions displayed on the display panel 100. The lenticular lenses 210 may be arranged to be inclined at the inclination angle (a) with respect to the vertical axis of the display panel 100. In other words, the arrangement axis 130 of the pixels 110 and a lens axis of the lenticular lenses 210 may be substantially parallel to each other.

In addition, the lenticular lenses 210 are arranged such that each of the lenticular lenses 210 is positioned over two or more pixels 110 among the pixels arranged in the horizontal axis of the display panel 100. The pitch (i.e. width) of the lenticular lenses 210 is set to have a specific relation with a horizontal pitch of the pixels 110 based on number of desired viewpoints for the 3D image. For instance, as shown in FIGS. 2 and 3, each of the lenticular lenses 210 is wide enough to overlap, and is positioned over, nine pixels 110 arranged along the horizontal axis of the display panel 100, so that the 3D image display apparatus may display the 3D image to nine viewpoints.

In the present exemplary embodiment, a boundary between the lenticular lenses 210 is not overlapped with the pixels 100. That is, the boundary between the lenticular lenses 210 is disposed to overlap with the area in which the light blocking layer 120 is disposed as shown in FIGS. 2 and 3.

Thus, the 3D image display apparatus employing the display panel 100 and the lenticular lenses 200 shown in FIGS. 2 and 3 may prevent the quality of the display from being degraded due to a cross-talk phenomenon because the boundary between the lenticular lenses 210 is not overlapped with the pixels 110.

Figure 4:
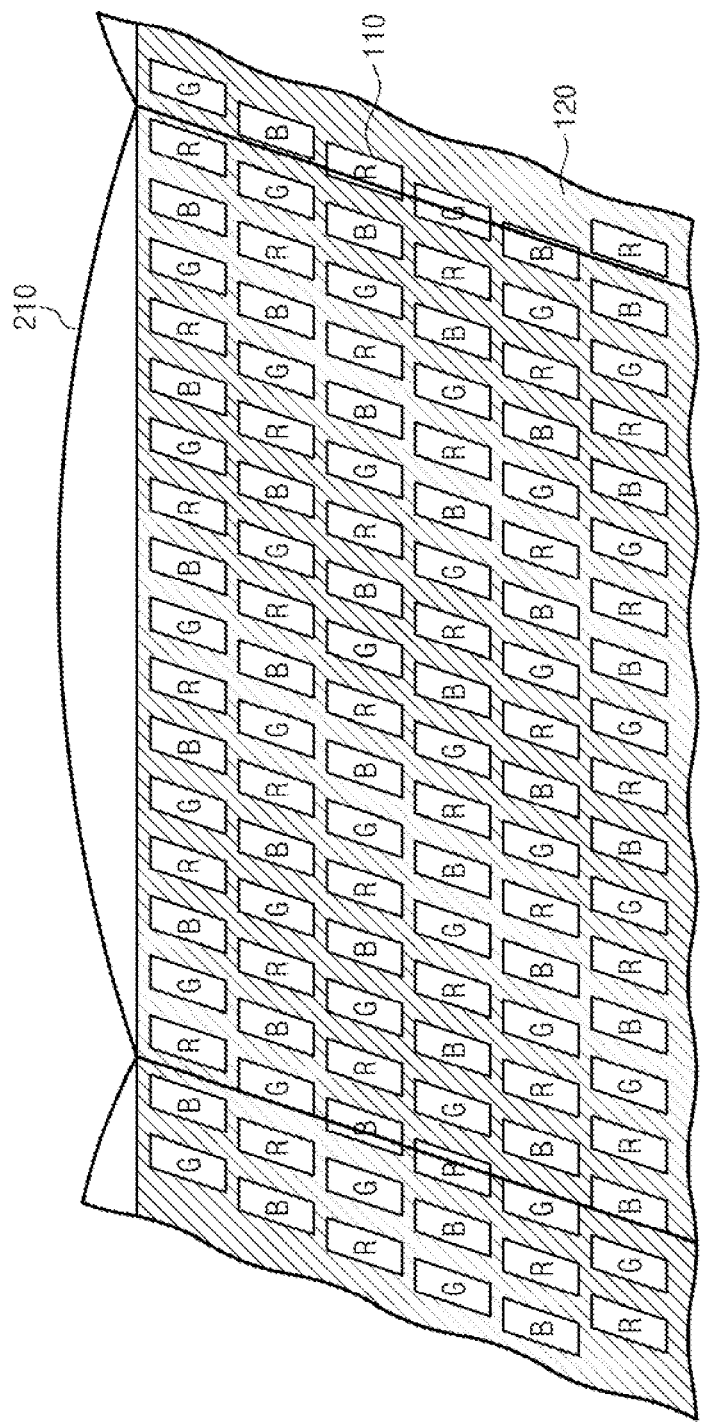

Referring to FIG. 4, each of the lenticular lenses 210 may be disposed to correspond to sixteen pixels 110 arranged in the horizontal axis of the display panel 100 such that the 3D image display apparatus may display the 3D image to sixteen viewpoints.

In this case, the pixels 110 are arranged to be aligned in the direction substantially parallel to the lens axis 220 of the lenticular lenses 210. The colors of the pixels 110 are arranged so that the red (R), green (G), and blue (B) colors alternate sequentially in both the direction substantially parallel to the horizontal axis of the display panel 100 (i.e., along the row direction) and in the direction substantially parallel to the lens axis (i.e. along the column direction).

In the present exemplary embodiment, the pixels 110 are substantially parallel to each other, but the pixels 110 are not arranged in a line along the lens axis 220 of the lenticular lenses 210 (which lens axis 220 is inclined at an inclination angle with respect to the vertical axis of the display panel 100). As shown in FIG. 4, the position of the pixels 110 in each row of pixels shifts back and forth with respect to the lens axis 220.

As a result, a portion of the pixels 110 disposed adjacent to the boundary between the lenticular lenses 210 may be overlapped with the boundary between the lenticular lenses 210.

As described above, the 3D image display apparatus shown in FIG. 4 may prevent deterioration of the quality of the display due to the cross-talk phenomenon because the lens axis 220 of the lenticular lenses 210 is substantially parallel to the arrangement axis 130 of the pixels 110. In addition, the 3D image display apparatus shown in FIG. 4 may prevent the deterioration of the quality of the display caused by a moiré phenomenon, because a portion of the pixels 110 is overlapped with the boundary between the lenticular lenses 210.

Figure 5:
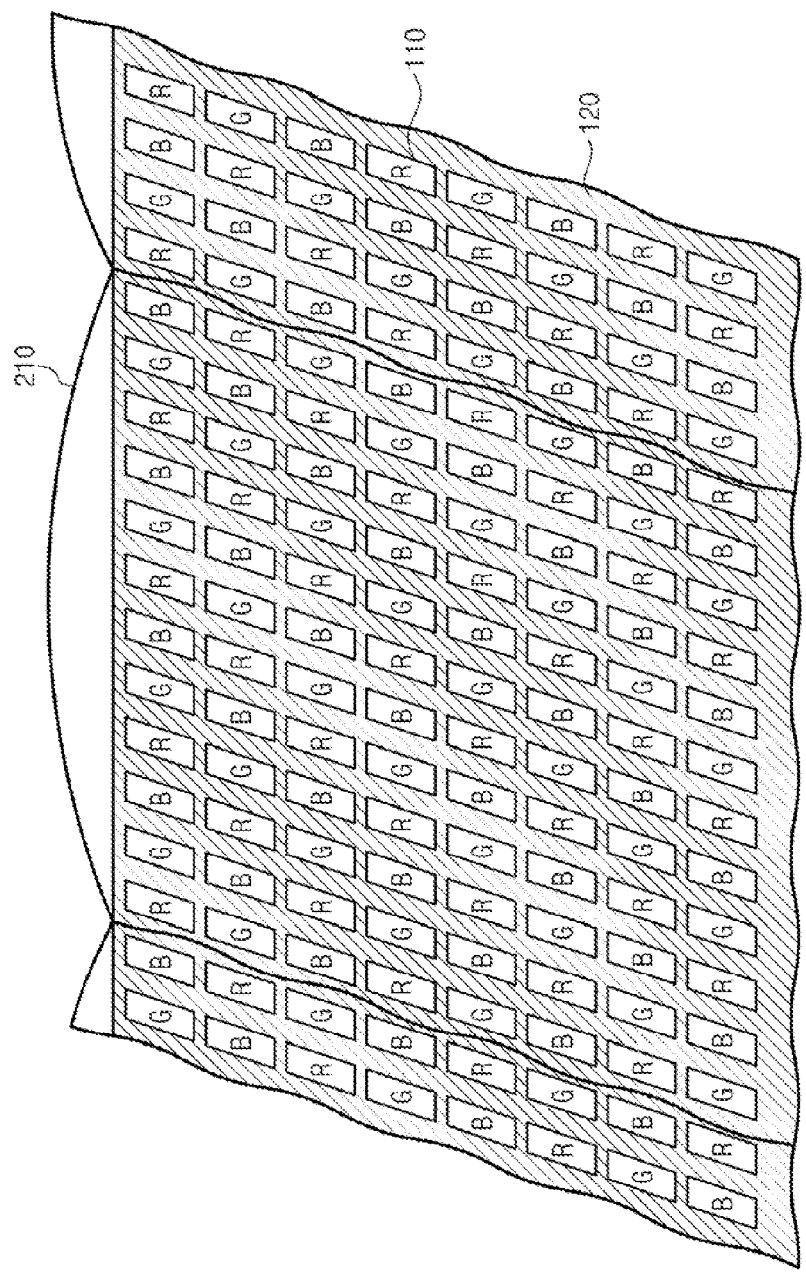
Figure 6:
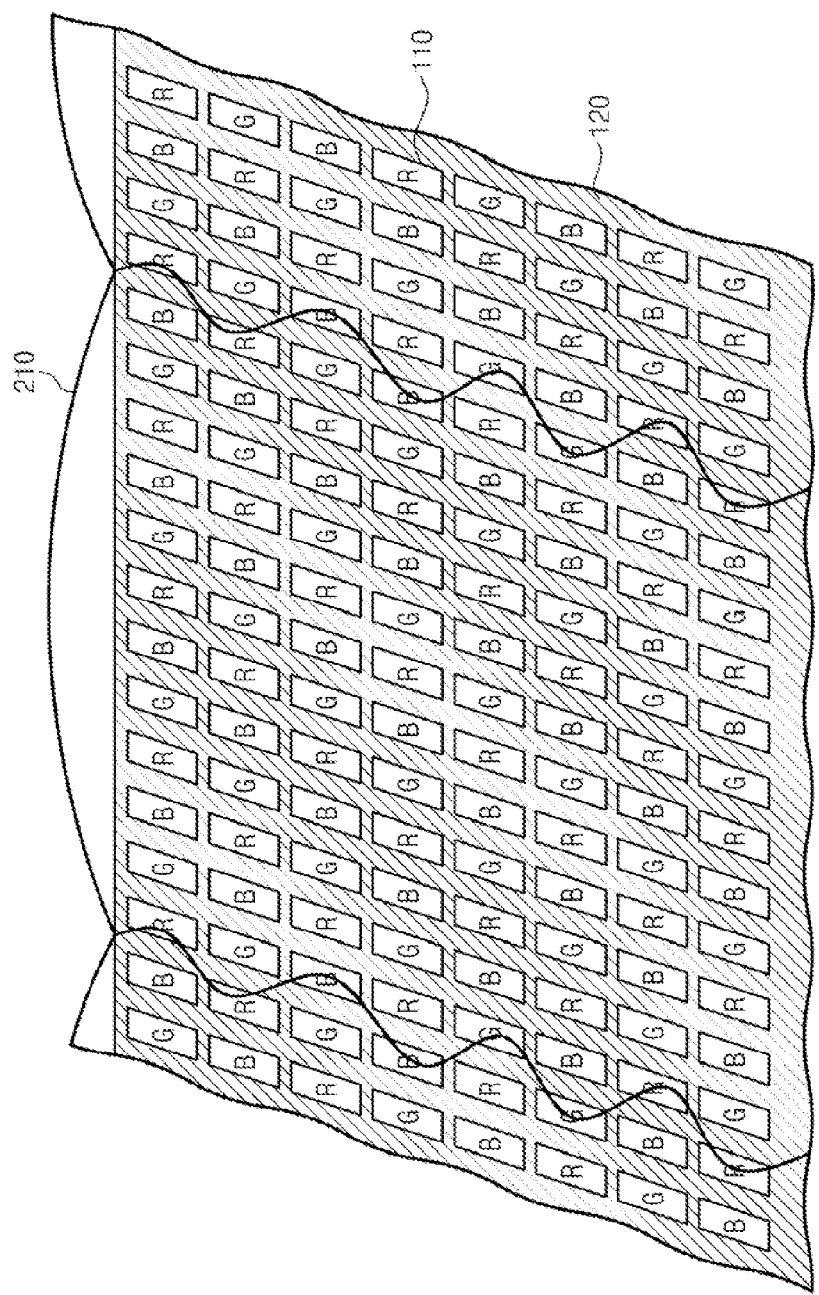
Figure 7:
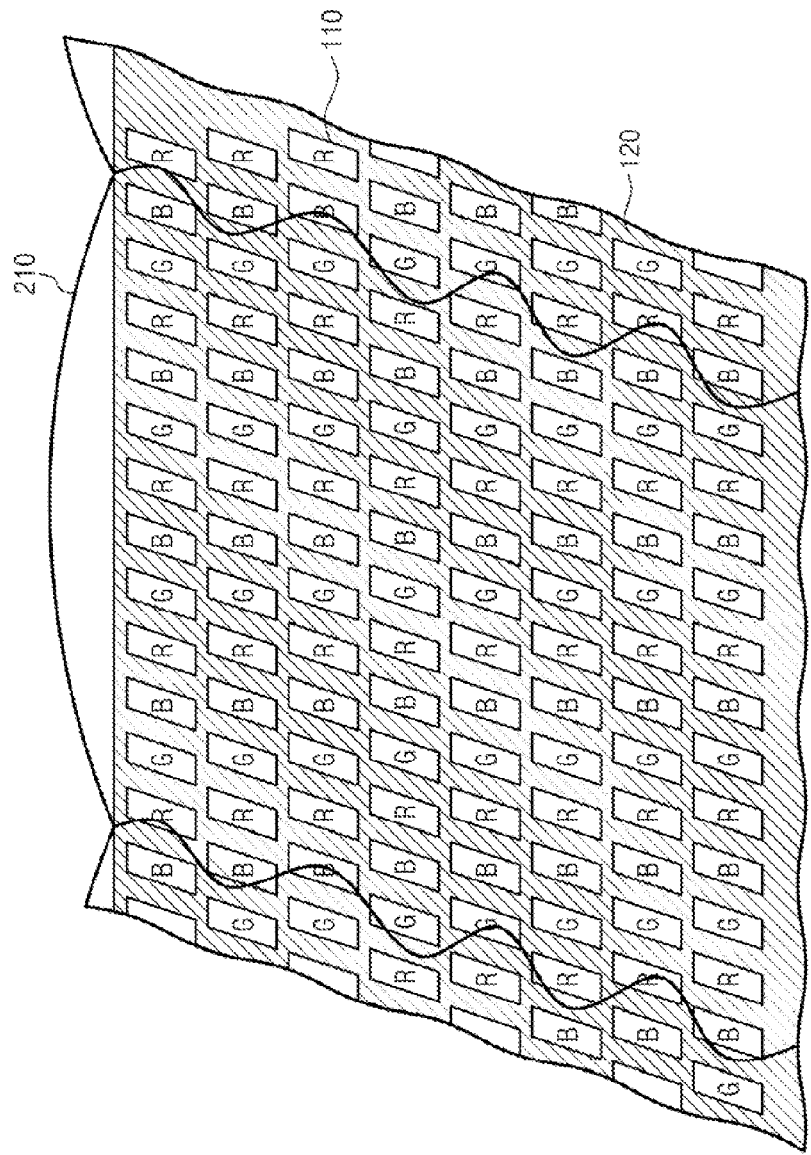

Referring to FIGS. 5 to 7, the boundary between the lenticular lenses 210 of the lenticular lens plate 200 has a wave shape.

In detail, as shown in FIG. 5, the pixels 110 are arranged so that, in the vertical (column) direction, they are aligned substantially parallel to the lens axis 220 of the lenticular lenses 210. That is, the arrangement axis 130 of the pixels 110 is substantially parallel to the lens axis 220. The colors of the pixels 110 are arranged so that the red (R), green (G), and blue (B) colors alternate sequentially in both the direction substantially parallel to the horizontal axis of the display panel 100 (i.e., along the row direction) and in the direction substantially parallel to the lens arrangement axis 130 (i.e., along the column direction).

The boundary of the lenticular lenses 210 in FIG. 5, which has a wave shape, is overlapped with the area between the pixels 110, which is substantially parallel to the arrangement axis 130. In other words, the boundary between the lenticular lenses 210 is overlapped with the area corresponding to the light blocking layer 120, which is substantially parallel to the lens axis of the lenticular lenses 210.

In FIG. 6, the arrangement of the pixels 110 is the same as the arrangement of the pixels 110 shown in FIG. 5 and the lens axis 220 of the lenticular lenses 210 is substantially parallel to the arrangement axis 130 of the pixels 110. In this case, the boundary between the lenticular lenses 210 has the wave shape that is exaggerated as compared to the wave shape in FIG. 5, i.e., the distance between the crest and troughs of the wave shape in FIG. 6 is larger than in FIG. 5. As a result, the boundary between the lenticular lenses 210 may be overlapped with the pixels 110 disposed adjacent to the boundary between the lenticular lenses 210.

Referring to FIG. 7, the colors of the pixels 110 are arranged so that the red (R), green (G), and blue (B) colors alternate sequentially in the direction substantially parallel to the horizontal axis of the display panel 100 (i.e., in the row direction). The colors of the pixels 110 are also arranged so that the red (R), blue (B), and green (G) colors alternate sequentially in the direction substantially parallel to the lens axis 220 of the lenticular lenses 210 (i.e., along the column direction, in the direction of the lens axis 220). In the present exemplary embodiment, the pixels 100 arranged in the direction substantially parallel to the lens axis 220 of the lenticular lenses 210 are substantially parallel to each other but are not regularly disposed. That is, the arrangement 130 of the pixels 110 is substantially parallel to the lens axis 220, but a portion of the pixels 110 is overlapped with the lens axis 220 of the lenticular lenses 210 or the boundary between the lenticular lenses 210, i.e., the position of the pixels along the lens axis 220 shifts with respect to the lens axis 220.

The 3D image display apparatuses shown in FIGS. 5 to 7 may prevent deterioration of the quality of the display, which is caused by the cross-talk phenomenon, because the lens axis 220 of the lenticular lenses 210 is substantially parallel to the arrangement axis 130 of the pixels 110. In addition, the boundary between the lenticular lenses 210 has the wave shape, and thus the 3D image display apparatuses may prevent the quality of the display from being degraded due to the moiré phenomenon.

Figure 8:
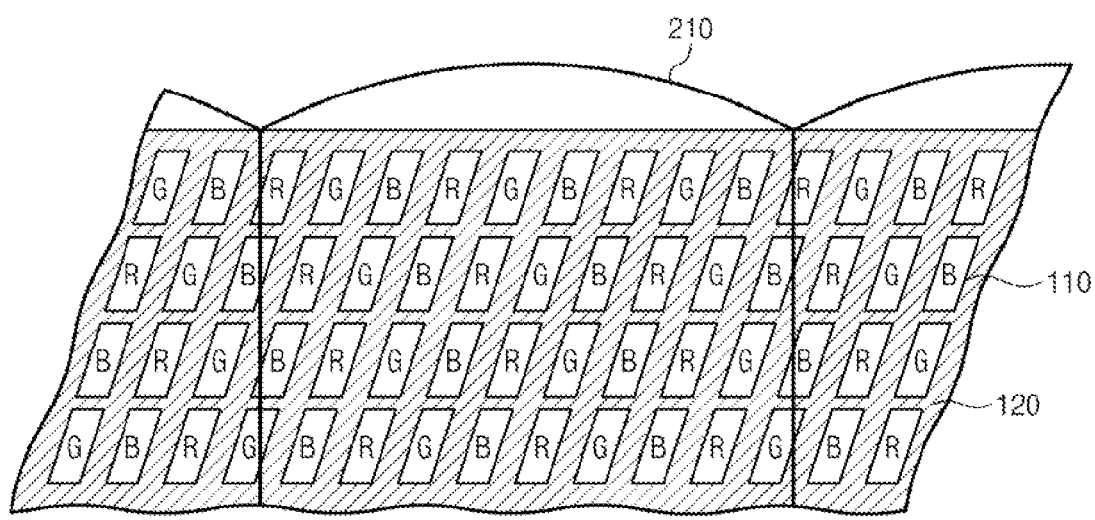

Referring to FIG. 8, the pixels 110 are arranged so that, in the vertical (column) direction, they are inclined with respect to the vertical axis of the display panel 110. That is, the arrangement axis 130 of the pixel 110 is inclined at the inclination angle (a) with respect to the vertical axis of the display panel 100. The colors of the pixels 110 are arranged so that the red (R), green (G), and blue (B) colors alternate sequentially in both the direction substantially parallel to the horizontal axis of the display panel 100 (i.e., along the row direction) and the direction substantially parallel to the vertical axis of the display panel 100 (i.e., along the column direction), and in the direction inclined with respect to the vertical axis of the display panel 100.

In addition, the lenticular lenses 210 have the lens axis 220 that is substantially parallel to the vertical axis of the display panel 100.

Accordingly, the boundary between the lenticular lenses 210 is overlapped with a portion of the pixels 110. Thus, the 3D image display apparatus shown in FIG. 8 may prevent the quality of the display from being degraded due to the moiré phenomenon.

Figure 9:
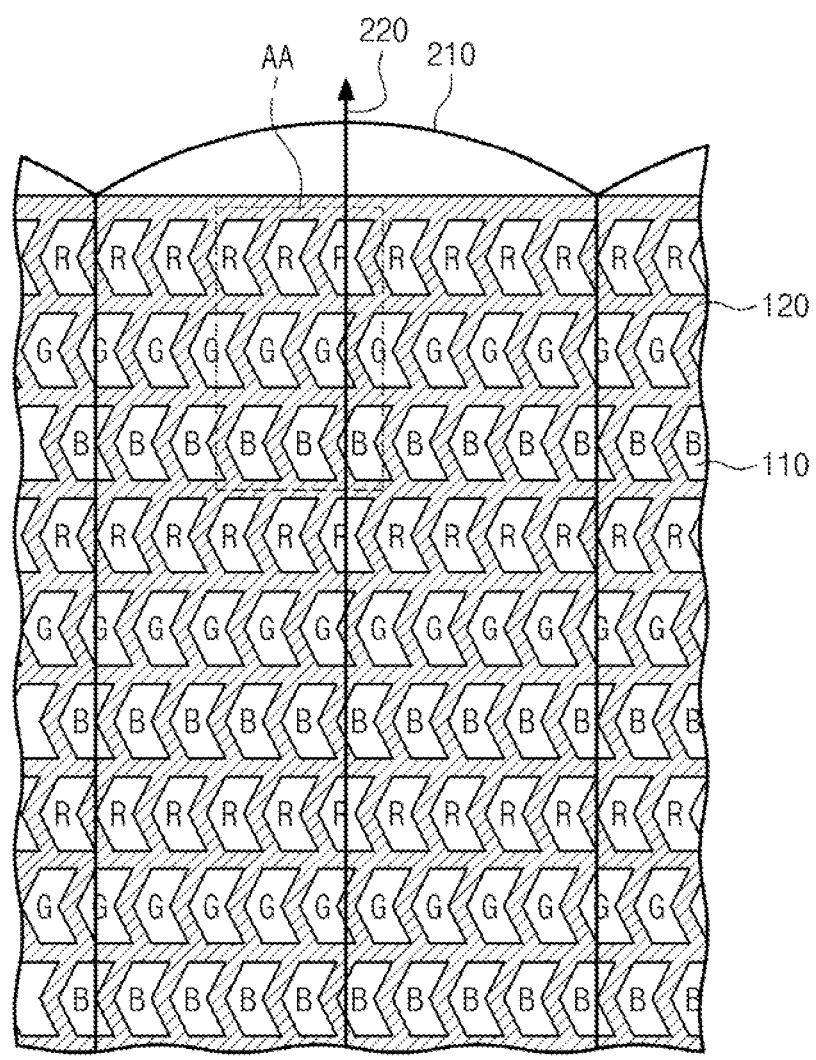
FIG. 9 is a view showing a 3D image display apparatus according to an exemplary embodiment.
Figure 10:
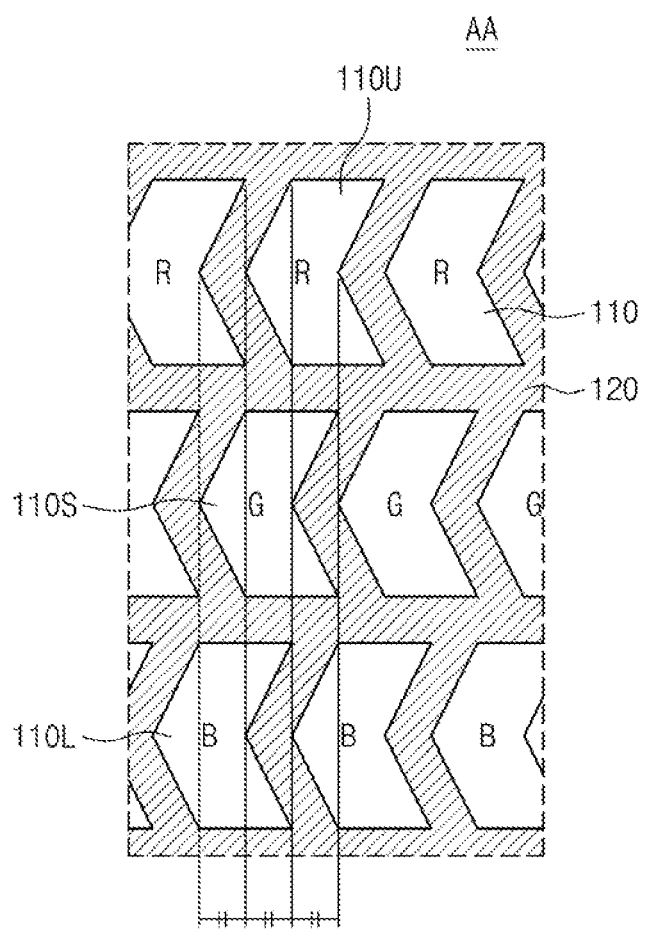
FIG. 10 is an enlarged view showing a portion AA shown in FIG. 9.
Figure 11:
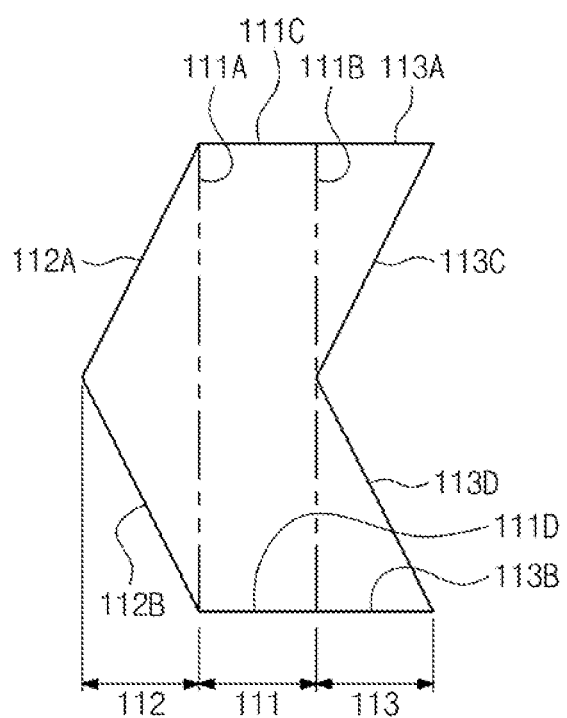
FIG. 11 is an enlarged view showing one pixel of pixels shown in FIG. 10.
Figure 12:
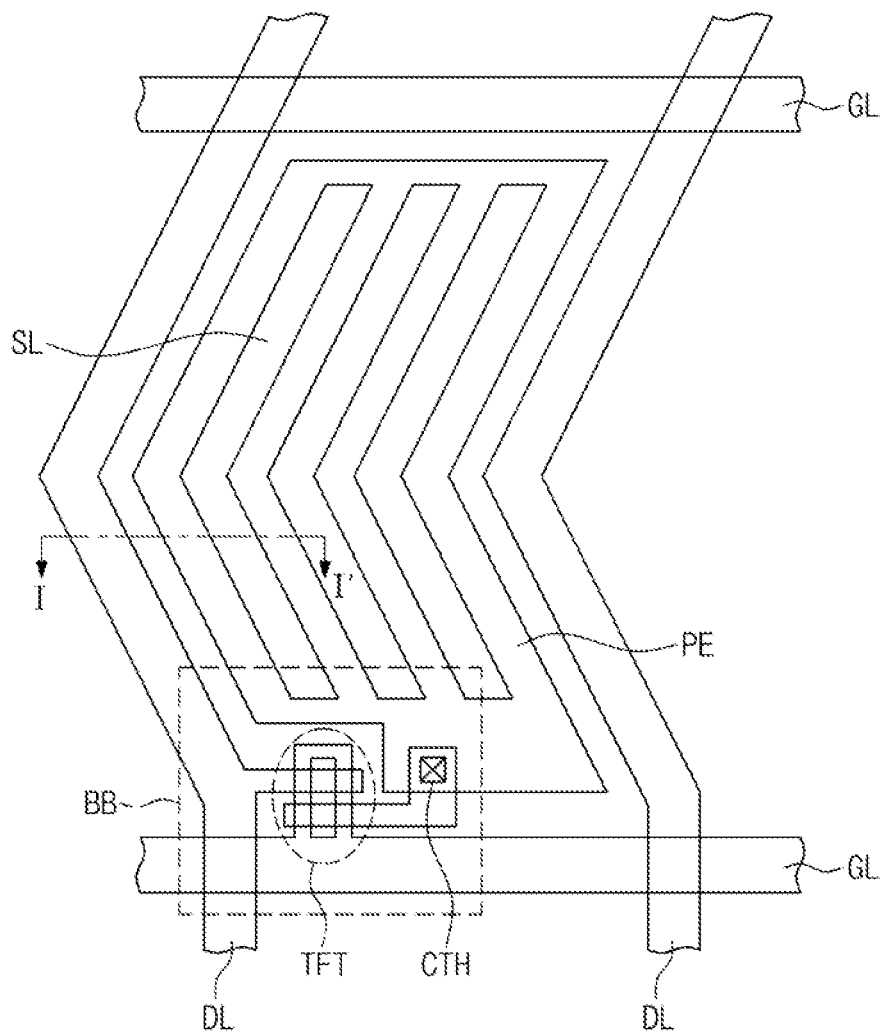
FIG. 12 is a plan view showing one pixel of pixels shown in FIG. 10.
Figure 13:
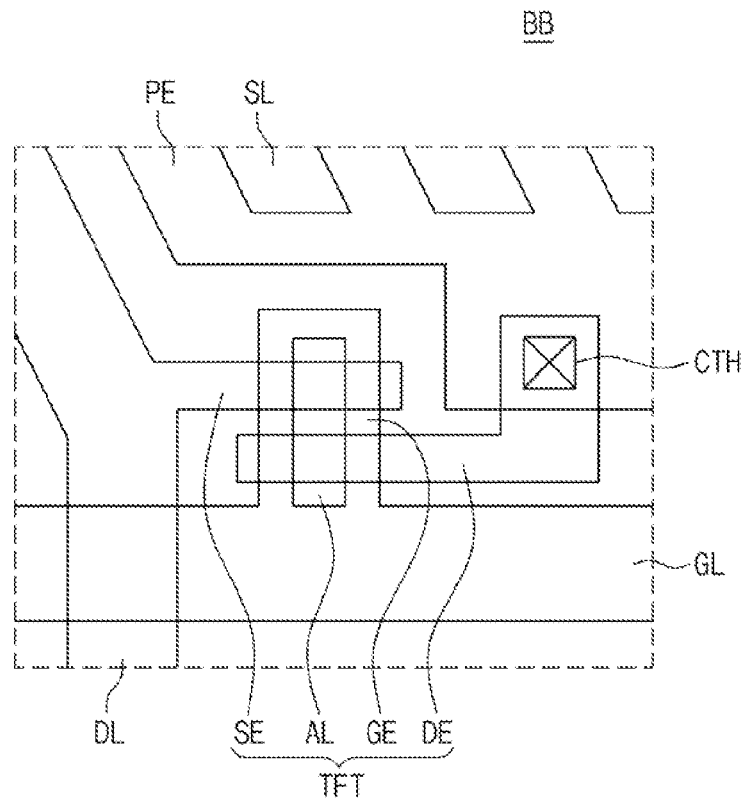
FIG. 13 is a cross-sectional view taken along a line I-I' shown in FIG. 12.
Figure 14:
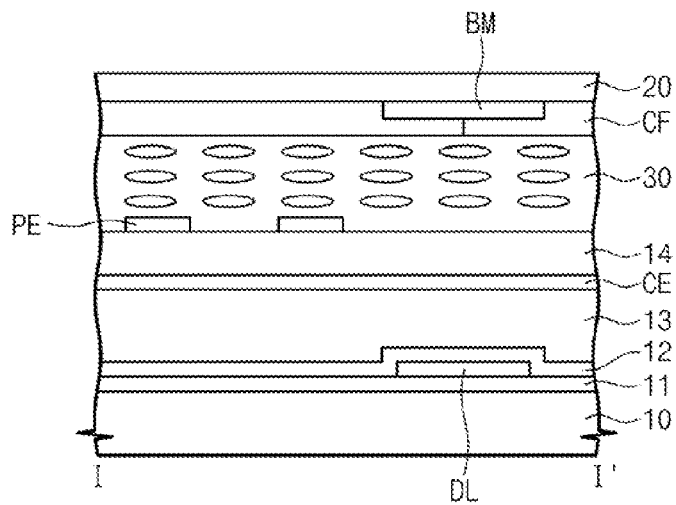
FIG. 14 is a plan view showing a portion BB shown in FIG. 12.

FIG. 9 is a view showing a 3D image display apparatus according to an exemplary embodiment, FIG. 10 is an enlarged view showing a portion AA shown in FIG. 9, FIG. 11 is an enlarged view showing one pixel of pixels shown in FIG. 10, FIG. 12 is a plan view showing one pixel of pixels shown in FIG. 10, FIG. 13 is a cross-sectional view taken along a line I-I' shown in FIG. 12, and FIG. 14 is a plan view showing a portion BB shown in FIG. 12. In FIGS. 9 to 14, the same reference numerals denote the same elements as in FIGS. 1 to 8, and thus detailed descriptions of those same elements is omitted in order to avoid redundancy.

Referring to FIGS. 9 to 14, a 3D image display apparatus includes a display panel 100 including a plurality of pixels 110 disposed thereon and a lenticular lens plate 200 including a plurality of lenticular lenses 210 and disposed in front of the display panel 100.

In the display panel 100 of the present exemplary embodiment, the pixels 110 are arranged so that, in the direction substantially parallel in a horizontal axis of the display panel 100, the pixels 110 have the same color, and in the direction substantially parallel to the vertical axis of the display panel 100, the red (R), green (G), and blue (B) colors alternate sequentially. As an alternative, the pixels 110 can be arranges so that it is in the direction substantially parallel to the vertical axis of the display panel 100, that the pixels 110 have the same color, while in the direction substantially parallel to the horizontal axis of the display panel 100, the red (R), green (G), and blue (B) colors alternate sequentially. As shown in FIG. 11, each of the pixels 110 includes a first area 111 having a generally rectangular shape, a second area 112, and a third area 113. The second area 112 and the third area 113 are disposed at opposite sides of the first area 111 with reference to an imaginary line (hereinafter, referred to as a first imaginary line) substantially parallel to the vertical axis of the display panel 100 and crossing the first area 111.

In detail, the first area 111 has the rectangular shape. For instance, the first area 111 includes first and second sides 111A and 111B substantially parallel to the vertical axis of the display panel 100 and third and fourth sides 111C and 111D substantially parallel to the horizontal axis of the display panel 100. In this case, the first area 111 has a width in the horizontal axis direction of the display panel 100, and the width of the first area 111 is the same as a length of the third side 111C and the fourth side 111D. The second area 112 may be disposed adjacent to the first side 111A of the first area 111. The second area 112 includes a fifth side 112A and a sixth side 112B respectively having first ends connected to the first side 111A and second ends making contact with each other. In other words, the second area 112 has a triangular shape making contact with the first side 111A, and a distance between the first side 111A and a contact point at which the fifth side 112A makes contact with the sixth side 112B may be equal to the width of the first area 111. In addition, the second area 112 has an area equal to half of the area of the first area 111. The fifth side 112A and the sixth side 112B form an outside edge of the pixel 110.

The third area 113 is disposed adjacent to the second side 111B of the first area 111. The third area 113 includes seventh and eighth sides 113A and 113B, respectively, that extend from the third side 111C and the fourth side 111D. The third area 113 also includes ninth and tenth sides 113C and 113D, respectively, that connect ends of the seventh and eighth sides 113A and 113B to the second side 111B. Each of the seventh side 113A and the eighth side 113B may have a length equal to the width of the first area 111. In addition, the third area 113 has an area equal to half of the area of the first area 111. The ninth and tenth sides 113C and 113D, respectively, form outside edges of the pixel 110. The seventh and eight sides 113A and 113B, respectively, along with the third and fourth sides 111C and 111D form outside edges of the pixel 110.

As shown in FIG. 10, in a group of three pixels, there is a central pixel, referred to as a reference pixel 110S, a pixel 110U (hereinafter, referred to as upper pixel) disposed at an upper portion of the reference pixel 110S and a pixel 110L (hereinafter, referred to as lower pixel) disposed at a lower portion of the reference pixel 110S. The pixels 110 S, 110U and 110L have the same shape with reference to an imaginary line (hereinafter, referred to as second imaginary line) substantially parallel to the horizontal axis of the display panel 100.

In addition, the first area 111 of the upper pixel 110U is disposed adjacent to one of both sides of the first area 111 of the reference pixel 110S, e.g., a right side, after being shifted to the right side of the reference pixel 110S, and the first area 111 of the lower pixel 110L is disposed adjacent to a remaining one of the both sides of the first area 111 of the reference pixel 110S, e.g., a left side, after being shifted to the left side of the reference pixel 110S.

In detail, the second area 112 of the reference pixel 110S is positioned directly above the first area 111 of the lower pixel 110L and the second area 112 of the upper pixel 110U is positioned above the first area 111 of the reference pixel 110S. The second areas 112 for the reference pixel 110S, the upper pixel 110U, and the lower pixel 110L make contact with the first sides 111A of the first areas 111 of the reference pixel 110S, the upper pixel IOU, and the lower pixel 110L, respectively, and the third areas 113 of the reference pixel 110S, the upper pixel 110U, and the lower pixel 110L make contact with the second sides 111B of the first areas 111 of the reference pixel 110S, the upper pixel 110U, and the lower pixel 110L, respectively. Thus, all of the pixels 110 in FIG. 9 are oriented, or pointing, in the same direction.

In this case, an area between imaginary lines respectively extended from the first side 111A and the second side 111B of the first area 111 of the reference pixel 110S, i.e., an extension area of the first area 111 of the reference pixel 110S, may correspond to the second area 112 of the upper pixel 110U and the third area 113 of the lower pixel 110L.

Accordingly, a sum of the areas, which correspond to the area between the imaginary lines respectively extended from the first side 111A and the second side 111B, of the upper pixel 110U, the reference pixel 110S, and the lower pixel 110L, may be two times larger than the first area 111.

In addition, an area between the imaginary line extended from the first side 111A and an imaginary line substantially parallel to the first imaginary line, which crosses the contact point at which the fifth and sixth sides 112A and 112B of the second area 112 make contact with each other, corresponds to the first area 111 and the third area 113. In detail, the area extended from the second area 112 of the reference pixel 110S to be parallel to the first imaginary line corresponds to the first area 111 of the lower pixel 110L and the third area 113 of the pixel adjacent to the upper pixel 110U in the second imaginary line. Thus, a sum of the areas, which correspond to the area extended from the second area 112 of the reference pixel 110S to be parallel to the first imaginary line, of the upper pixel 110U, the reference pixel 110S, and the lower pixel 110L may be two times larger than the first area 111.

In addition, an area between the imaginary line extended from the second side 111B and an imaginary line substantially parallel to the first imaginary line, which crosses the end of the seventh side 113A or the eighth side 113B corresponds to the first area 111 and the second area 112. In detail, the area extended from the third area 113 of the reference pixel 110S to be parallel to the first imaginary line corresponds to the first area 111 of the upper pixel 110U and the second area 112 of the pixel adjacent to the lower pixel 110L in the second imaginary line. Thus, a sum of the areas, which correspond to the area extended from the third area 113 of the reference pixel 110S to be parallel to the first imaginary line, of the upper pixel 110U, the reference pixel 110S, and the lower pixel 110L may be two times larger than the first area 111.

As shown in FIG. 9, the lenticular lenses 210 may have the lens axis 220 substantially parallel to the vertical axis of the display panel 100. Each of the lenticular lenses 210 is wide enough to overlap two or more pixels among the pixels arranged along the direction of the horizontal axis of the display panel 100, and the pitch of the lenticular lenses 210 is set to have a specific relation with the horizontal pitch of the pixels 110 based on the number of desired viewpoints. For instance, as shown in FIGS. 8 and 9, each of the lenticular lenses 210 is wide enough to overlap, and is positioned over, nine pixels 110 arranged along the horizontal axis of the display panel 100, so that the 3D image display apparatus may display the 3D image to nine viewpoints.

In the 3D image display apparatus employing the display panel 100 having the above-mentioned pixel structure, the area of the pixels corresponding to the area of the specific width with respect to the horizontal axis of the display panel 100 is uniform. Accordingly, the 3D image display apparatus may present uniform brightness in the area having the specific width with respect to the horizontal axis. As a result, the 3D image display apparatus may prevent the deterioration of the quality of the display, which is caused by non-uniform brightness in each area.

Hereinafter, the pixel 110 will be described with reference to FIGS. 12 to 14.

Referring to FIGS. 12 to 14, the thin film transistor TFT is connected to a corresponding gate line of gate lines GL and a corresponding data line of data lines DL. The thin film transistor TFT is a switching device to output the data signal in response to the gate signal.

The gate lines GL are disposed on a first substrate 10. The thin film transistor TFT includes a gate electrode GE branched from the corresponding gate line. That is, the gate electrode GE is protruded from the corresponding gate line when viewed in a plan view.

A gate insulating layer 11 is disposed on the first substrate 10 to cover the gate lines GL and the gate electrode GE.

The thin film transistor TFT includes an active layer AL disposed on the gate electrode GE with a gate insulating layer 11 interposed therebetween. The active layer AL includes a metal oxide material having a semiconductor property. That is, the active layer includes, for example, at least one of zinc oxide, zinc tin oxide, zinc-indium oxide, zinc-gallium oxide, or zinc indium gallium oxide.

The data lines DL are disposed on the gate insulating layer 11. The thin film transistor TFT includes a source electrode SE branched from the corresponding data line of the data lines DL, and a drain electrode DE spaced apart from the source electrode SE when viewed in a plan view.

A protective layer 12 and an organic layer 13 are sequentially disposed on the first substrate 10 to cover the drain electrode DE, the source electrode SE, and the data lines DL. The protective layer 12 may be omitted.

The organic layer 13 includes an organic material, such as an acrylic resin, to serve as a planarization layer. The common electrode CE is disposed on the organic layer 13.

An insulating layer 14 is disposed on the common electrode CE and a pixel electrode PE is disposed on the insulating layer 14.

The pixel electrode PE is connected to the drain electrode DE through a contact hole CTH as shown in FIGS. 12 to 14. The pixel electrode PE receives the data signal through the drain electrode DE.

The pixel electrode PE includes a plurality of slits SL. For instance, the pixel electrode PE may include three slits SL as shown in FIG. 12.

Accordingly, a planar electric field may be applied to the display panel 100 employing the pixel shown in FIGS. 12 to 14 because the common electrode CE and the pixel electrode PE are disposed on the first substrate 10. Thus, the liquid crystal layer 30 may be operated by the planar electric field.

Figure 15:
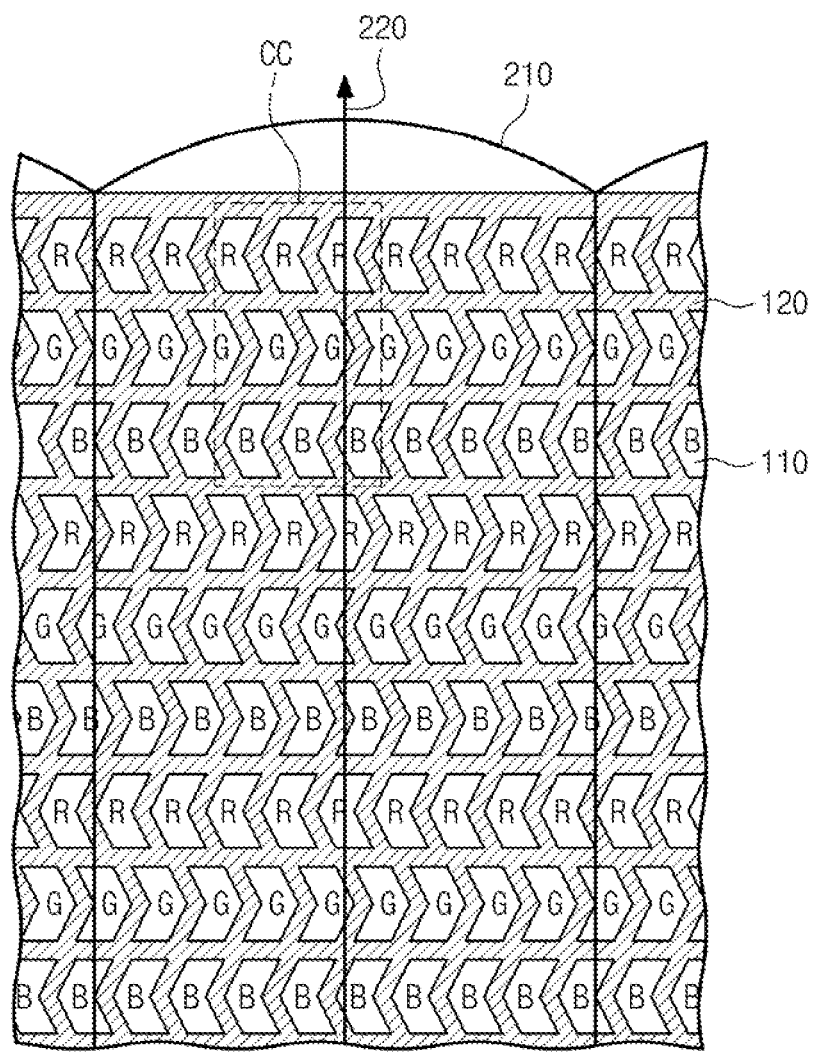
FIG. 15 is a view showing a 3D image display apparatus according to an exemplary embodiment.
Figure 16:
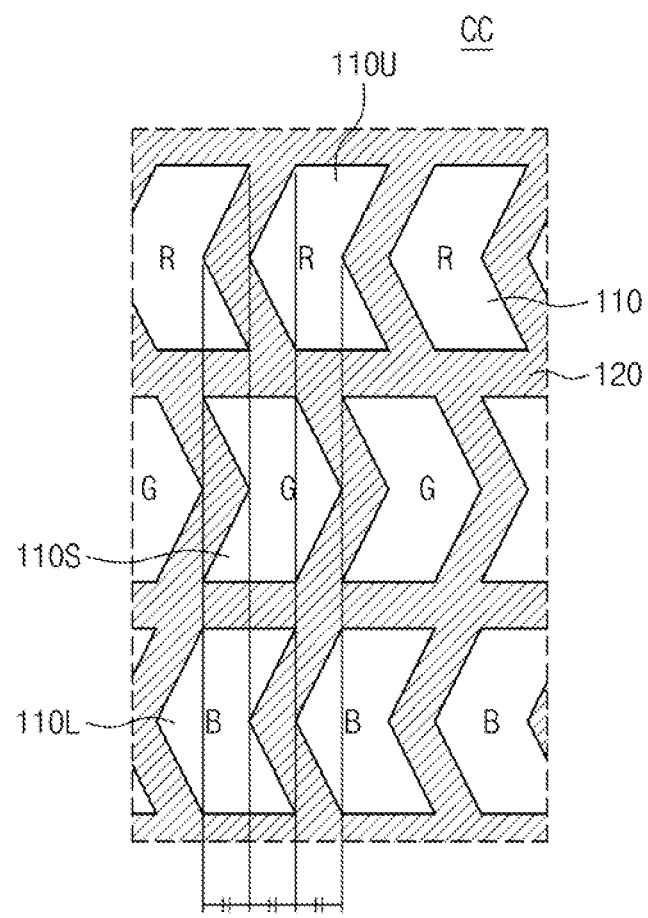
FIG. 16 is an enlarged view showing a portion CC shown in FIG. 15.

FIG. 15 is a view showing a 3D image display apparatus according to an exemplary embodiment and FIG. 16 is an enlarged view showing a portion CC shown in FIG. 15. In FIGS. 15 and 16, the same reference numerals denote the same elements as in FIGS. 1 to 14, and thus detailed descriptions of those same elements is omitted.

Referring to FIGS. 15 and 16, the 3D image display apparatus includes a display panel 100 and a lenticular lens plate 200. The display panel 100 includes the pixels 110 disposed on the display panel 100 and the lenticular lens plate 200 disposed in front of the display panel. The lenticular lens plate 200 includes a plurality of lenticular lenses 210.

As shown in FIG. 16, one pixel is referred to as a reference pixel 110S, a first area 111 (described above with respect to FIG. 11) of a lower pixel 110L disposed below the reference pixel 110S is shifted to a left side of the reference pixel 110S, and a first area 111 of an upper pixel 110U disposed above the reference pixel 110S is shifted to the right side of the reference pixel 110S.

The second areas 112 of the reference pixel 110S makes contact with the second side 111B, and the third side 113 of the reference pixel 110S makes contact with the first side 111A. The second area 112 of the upper pixel 110U and the lower pixel 110L makes contact with the first side 111A, and the third area 113 of the upper pixel 110U and the lower pixel 110L makes contact with the second side 111B. Thus, pixels in alternate rows are oriented, or pointing, in opposite directions.

In this case, an area extended from the first area 111 of the reference pixel 110S in a direction substantially parallel to the first imaginary line may correspond to the second area 112 of the upper pixel 110U and the third area 113 of the lower pixel 110L. Accordingly, a sum of the areas, which correspond to the area between the imaginary lines respectively extended from the first side 111A and the second side 111B, of the upper pixel 110U, the reference pixel 110S, and the lower pixel 110L may be two times larger than the first area 111.

In addition, an area extended from the second area 112 of the reference pixel 110S in the direction substantially parallel to the first imaginary line corresponds to the first area 111 of the lower pixel 110L and the third area 113 of the pixel adjacent to the upper pixel 110U in the direction of the second imaginary line. Thus, a sum of the areas, which correspond to the area extended from the second area 112 of the reference pixel 110S to be parallel to the first imaginary line, of the upper pixel 110U, the reference pixel 110S, and the lower pixel 110L may be two times larger than the first area 111.

In addition, an area extended from the third area 113 of the reference pixel 110S in the direction substantially parallel to the first imaginary line corresponds to the first area 111 of the upper pixel 110U and the second area 112 of the pixel adjacent to the lower pixel 110L in the direction of the second imaginary line. Thus, a sum of the areas, which correspond to the area extended from the third area 113 of the reference pixel 110S to be parallel to the first imaginary line, of the upper pixel 110U, the reference pixel 110S, and the lower pixel 110L may be two times larger than the first area 111.

In the 3D image display apparatus employing the display panel 100 having the above-mentioned pixel structure, the area of the pixels corresponding to the area of the specific width with respect to the horizontal axis of the display panel 100 is uniform. Accordingly, the 3D image display apparatus may present uniform brightness in the area having the specific width with respect to the horizontal axis. As a result, the 3D image display apparatus may prevent the deterioration of the quality of the display, which is caused by non-uniform brightness in each area.

Although the exemplary embodiments have been described, it is understood that the present invention should not be limited to these exemplary embodiments but various changes and modifications can be made by one ordinary skilled in the art within the spirit and scope of the disclosure, including the following claims.

What is claimed is:

1. A 3D image display apparatus comprising:
a display panel including a plurality of pixels arranged in m rows (where m is a natural number) to display an image;
a light blocking layer disposed between the pixels; and
a lenticular lens plate disposed in front of the display panel and including a plurality of lenticular lenses,
wherein the pixels are arranged to have an arrangement axis inclined with respect to a vertical axis of the display panel and the lenticular lenses have a lens axis that is substantially parallel to the arrangement axis,
wherein the arrangement axis is a linear axis that passes through a same point in each $n^{th}$ pixel (where n is a natural number) along a row in at least four adjacent rows and is parallel to a second axis that, between pixels adjacent in a row direction in the at least four adjacent rows, passes through only the light blocking layer,
wherein each of the pixels comprises a first side substantially parallel to a horizontal axis of the display panel and a second side adjacent to the first side and substantially parallel to the arrangement axis.

2. The 3D image display apparatus of claim 1, wherein a boundary between the lenticular lenses is overlapped with the light blocking layer.

3. The 3D image display apparatus of claim 2, wherein the boundary between the lenticular lenses has a wave shape.

4. The 3D image display apparatus of claim 1, wherein a portion of the pixels disposed adjacent to a boundary between the lenticular lenses is overlapped with the boundary between the lenticular lenses.

5. The 3D image display apparatus of claim 4, wherein the boundary between the lenticular lenses has a wave shape.

6. A 3D image display apparatus comprising:
a display panel including a plurality of pixels to display an image; and
a lenticular lens plate disposed in front of the display panel and including a plurality of lenticular lenses, each of the pixels comprising:
a first area having a rectangular shape with a width in a direction of a horizontal axis of the display panel;
a second area disposed adjacent to a first side of the first area, wherein the first side is adjacent the first area in a vertical direction perpendicular to the horizontal axis; and
a third area disposed adjacent to a second side of the first area opposite the first side,
wherein, when one pixel of the plurality of pixels is referred to as a reference pixel, the first area of a second pixel disposed directly below the reference pixel is shifted to one of a left side and a right side of the first area of the reference pixel by a distance equal to the width of the first area in the direction substantially parallel to the horizontal axis of the display panel, the first area of third pixel disposed directly above of the reference pixel is shifted to a remaining one of the left side and the right side of the first area of the reference pixel by the distance equal to the width of the first area, and each of the lenticular lenses include a lens axis substantially parallel to the vertical axis of the display panel.

7. The 3D image display apparatus of claim 6, wherein the first area further comprises third and fourth sides substantially parallel to the horizontal axis of the display panel and having a length equal to the width of the first area, and wherein the second area makes contact with the first side, and the third area makes contact with the second side.

8. The 3D image display apparatus of claim 7, wherein the second area comprises fifth and sixth sides respectively having first ends connected to the first side and respectively having second ends making contact with each other at a predetermined contact position.

9. The 3D image display apparatus of claim 8, wherein a distance between the first side and the contact position, at which the fifth and sixth sides make contact with each other, is equal to the width of the first area.

10. The 3D image display apparatus of claim 9, wherein the second area has a size equal to half of a size of the first area.

11. The 3D image display apparatus of claim 9, wherein the third area comprises:
   seventh and eighth sides respectively extended from the third and fourth sides; and
   ninth and tenth sides respectively connecting ends of the seventh and eighth sides to the second side.

12. The 3D image display apparatus of claim 11, wherein each of the seventh and eighth sides has a length equal to the width of the first area.

13. The 3D image display apparatus of claim 11, wherein the third area has a size equal to half of a size of the first area.

14. The 3D image display apparatus of claim 11, wherein an area between an imaginary line extended from the first side of the first area of the reference pixel and an imaginary line extended from the second side of the first area of the reference pixel corresponds to the second area of the upper pixel and the third area of the lower pixel.

15. The 3D image display apparatus of claim 6, wherein the first area further comprises third and fourth sides substantially parallel to the horizontal axis of the display panel, the second area of the reference pixel makes contact with the first side, the third area of the reference pixel makes contact with the second side, the second area of each of the upper and lower pixels makes contact with the first or the second side, and the third area of each of the upper and lower pixels makes contact with the first or the second side.

16. The 3D image display apparatus of claim 15, wherein each of the second and third areas has a size equal to half of a size of the first area.

17. The 3D image display apparatus of claim 15, wherein an area between an imaginary line extended from the first side of the first area of the reference pixel and an imaginary line extended from the second side of the first area of the reference pixel corresponds to the second area of the upper pixel and the third area of the lower pixel.

18. A 3D image display apparatus comprising:
   a display panel including a plurality of pixels to display an image; and
   a lenticular lens plate disposed in front of the display panel and including a plurality of lenticular lenses, each of the pixels comprising:
   a first area having a rectangular shape with a width in a direction of a horizontal axis of the display panel;
   a second area disposed adjacent to a first side of the first area, wherein the first side is adjacent the first area in a horizontal direction parallel to the horizontal axis; and
   a third area disposed adjacent to the a second side of the first area opposite the first side,
   wherein, when a pixel, through which an imaginary line substantially parallel to the horizontal axis of the display panel crosses, among the plurality of pixels is referred to as a reference pixel, a pixel disposed directly above the reference pixel is referred to as an upper pixel, and a pixel disposed directly below the reference pixel is referred to as a lower pixel,
   a sum of areas of a upper overlap area of the second area of the upper pixel and a lower overlap area of the third area of the lower pixel is equal to an area of the first area of the reference pixel, the upper overlap area, the lower overlap area, and the reference overlap area are areas which respectively overlap with a vertical imaginary area which is defined by a first and second vertical imaginary line parallel to the vertical direction and crosses over the first area of the first pixel.

19. The 3D image display apparatus of claim 18, wherein each of the second and third areas has a width in the direction substantially parallel to the horizontal axis of the display panel, and the first, second, and third areas have a same width.

20. The 3D image display apparatus of claim 19, wherein each of the second and third areas has a size equal to half of a size of the first area.

21. The 3D image display apparatus of claim 18, wherein the lenticular lenses have a lens axis substantially parallel to the vertical axis of the display panel.

22. A 3D image display apparatus comprising:
   a display panel including a plurality of pixels to display an image; and
   a lenticular lens plate disposed in front of the display panel and including a plurality of lenticular lenses, each of the pixels comprising:
   a first area having a rectangular shape with a width in a direction of a horizontal axis of the display panel;
   a second area disposed adjacent to a first side of the first area, wherein the first side is adjacent the first area in a horizontal direction parallel to the horizontal axis, wherein the second area has a size equal to half of a size of the first area; and
   a third area disposed adjacent to the a second side of the first area opposite the first side, wherein the third area has a size equal to half of a size of the first area,
   wherein, when a pixel, through which an imaginary line substantially parallel to the horizontal axis of the display panel crosses, among the plurality of pixels is referred to as a reference pixel, a pixel disposed directly above the reference pixel is referred to as an upper pixel, and a pixel disposed directly below the reference pixel is referred to as a lower pixel, a sum of areas of the upper and lower pixels is equal to a size of the first area, which corresponds to the first area extended parallel to the vertical direction perpendicular to the horizontal axis,
   wherein each of the lenticular lenses includes a lens axis substantially parallel to the vertical axis of the display panel and that crosses over an area of at least one pixel.

* * * * *